United States Patent
Newby et al.

[11] Patent Number: 5,752,999
[45] Date of Patent: May 19, 1998

[54] HOT GAS FILTERING APPARATUS

[75] Inventors: Richard A. Newby, Pittsburgh; Thomas E. Lippert; Gerald J. Bruck, both of Murrysville, all of Pa.

[73] Assignee: Westinghouse Electric Corporation, Pittsburgh, Pa.

[21] Appl. No.: 603,289

[22] Filed: Feb. 20, 1996

[51] Int. Cl.$^6$ .................................................. B01D 46/24
[52] U.S. Cl. .......................... 55/350.1; 55/484; 55/502; 55/508; 55/523
[58] Field of Search ........................ 55/350.1, 523, 55/502, 484, 482, 508, 504, 378, 341.1, 341.2, 341.3, 341.5, 341.6; 95/273

[56] References Cited

U.S. PATENT DOCUMENTS

| | | | |
|---|---|---|---|
| 2,974,748 | 3/1961 | Swanson | 55/350.1 |
| 4,003,727 | 1/1977 | O'Dell | 55/377 |
| 4,046,525 | 9/1977 | Matsuo et al. | 55/486 |
| 4,161,389 | 7/1979 | Staffin et al. | 55/341.6 |
| 4,235,610 | 11/1980 | Richard | 55/302 |
| 4,735,635 | 4/1988 | Israelson et al. | 95/20 |
| 4,764,190 | 8/1988 | Israelson et al. | 55/269 |
| 4,775,398 | 10/1988 | Howeth | 55/341.1 |
| 4,812,149 | 3/1989 | Griffin et al. | 95/280 |
| 4,818,257 | 4/1989 | Kennedy et al. | 55/97 |
| 4,904,287 | 2/1990 | Lippert et al. | 55/523 |
| 4,979,969 | 12/1990 | Herding | 55/523 |
| 5,123,944 | 6/1992 | Cooper | 55/341.1 |
| 5,185,019 | 2/1993 | Haldipur et al. | 55/378 |
| 5,205,850 | 4/1993 | Jenrich et al. | 55/350.1 |
| 5,453,116 | 9/1995 | Fischer et al. | 95/278 |

FOREIGN PATENT DOCUMENTS 0482396  4/1992  European Pat. Off.

Primary Examiner—Duane S. Smith

[57] ABSTRACT

A filtering apparatus for separating particulate matter from a gas stream. The filtering apparatus has a pressure vessel defining an interior chamber having a dirty gas inlet opening and a clean gas exit opening. A tubesheet is coupled within the pressure vessel thereby dividing said pressure vessel into a dirty gas side and a clean gas side. A support pipe for supporting a plenum chamber within the pressure vessel dirty gas side is securely coupled with the tubesheet. The plenum chamber for supporting a plurality of filter elements is coupled to the support pipe. The plenum chamber has a side wall having at least one dirty gas port and clean gas exit formed therein. The side wall further defines a clean gas chamber. A plurality of filter element guides are securely coupled within the clean gas chamber for supporting at least one filter element and preventing filter elements from moving laterally. A removable dirty gas port coupler for providing a particulate barrier seal between the dirty gas port and the plenum clean gas chamber is provided. A filter element support plate for supporting a filter element within the clean gas chamber is securely coupled adjacent the dirty gas port. The filter element support plate has at least one slot which is aligned coaxially with at least one of the plenum chamber dirty gas ports.

12 Claims, 4 Drawing Sheets

HOT GAS FILTERING APPARATUS

FIELD OF THE INVENTION

The present invention relates generally to hot-gas cleanup systems and more particularly to a filtering apparatus for separating solid or liquid (aerosols) particulate matter from a carrier fluid such as a flue gas derived from combustion or gasification and other like processes.

BACKGROUND OF THE INVENTION

Hot gas cleanup systems that are implemented to clean particulate matter from a gas stream are well known in the art. These systems are currently used to clean coal fired gas, pressurized fluidized bed combustion gas, gasification, and waste incineration. Additionally, gas cleanup systems may be applied to catalyst and precious metal recovery, calcination, catalytic cracking, and material recovery during chemical processing.

An example of a conventional hot gas cleanup system is disclosed in U.S. Pat. No. 5,143,530, to Haldipur et. al. and assigned to Westinghouse, and is hereby incorporated by reference. This hot gas cleanup system comprises a filter assembly which is mounted within a pressure vessel having a clean gas side and a dirty gas side. The filter assembly further comprises a plurality of filter element arrays supported within the dirty gas side of the pressure vessel, a plurality of tubesheets for supporting the filter element arrays, plenum pipes for channeling filtered clean gas to the clean side of the pressure vessel, and a back pulse system for cleaning particulates from the outer surface of the filter elements. These systems may employ various types of filter elements to filter particulate matter from a dirty gas steam.

Typical filter elements employed to filter particulate matter include cross-flow filters, ceramic circular cylindrical filters (candle filters), bag or fabric filters, and porous metal candle filters. These filter elements are generally mounted within a pressure vessel so that a hot gas can first flow through the filter elements outside surface such that a substantial part of fine particulate matter within the dirty gas can be removed therefrom.

Typically, as a gas stream flows through a filter element, dirty fine particulates collect on the outer surface of the filter elements while the clean gas flows through the filter media, into the plenum pipes, and out into the clean gas side of the pressure vessel. A substantial amount of the fine particulate matter that is collected on the outside of the filter is removed therefrom by a reverse gas pulse provided by the back pulse system which removes the particulate matter from the filter element outer surface. The removed particulate matter is then collected in a hopper and discharged. There are several problems, however, that may arise during the operation of a hot gas cleanup system.

One problem is the formation of bridges of ash between the outer surfaces of adjacent filter elements. The bridging of ash can contribute to the failure or breakage of filter elements which would require that the entire system be shut down so that the filter elements can be replaced. It would therefore be desirable to provide a filtering apparatus that reduces the potential for bridging of ash.

Another problem is that a broken filter element may drop from its array and potentially cause damage to other intact filters or damage to other components within the clean up system. It would therefore be desirable to provide a means for protecting intact filters and other components within the system from falling broken filter elements.

Another problem with conventional cleanup systems is that replacement of an individual filter element requires that surrounding pressure vessel components be moved in order to gain access to individual filter elements. It would be desirable to provide a pressure vessel that provided easy access to individual filter elements.

SUMMARY OF THE INVENTION

The present invention provides a filtering apparatus for separating particulate matter from a gas stream. The filtering apparatus comprises a pressure vessel that defines an interior chamber having a dirty gas inlet opening and a clean gas exit opening. A tubesheet is securely coupled within the pressure vessel thereby dividing the pressure vessel into a dirty gas side and a clean gas side. A support tube for supporting a plenum chamber within the pressure vessel dirty gas side tube is securely coupled with the tubesheet. A plenum chamber for supporting a plurality of filter elements is coupled to the support tube within the dirty gas side of the pressure vessel. The plenum chamber comprises a side wall having at least one dirty gas port and clean gas exit formed therein. The side wall further defines a clean gas chamber. A plurality of filter element guides are securely coupled within the clean gas chamber. The filter element guides support at least one filter element within the plenum chamber and prevent the filter element from moving laterally. A removable dirty gas port coupler is employed for providing a particulate barrier seal between the dirty gas port and the plenum clean gas chamber. A clean gas flow pipe is employed for providing a flow path for filtered gas. The flow pipe is securely coupled with the clean gas exit. A filter element support plate for supporting a filter element within the clean gas chamber is securely coupled adjacent the dirty gas port. The filter element support plate has at least one slot which is aligned coaxially with at least one of the plenum chamber dirty gas ports.

BRIEF DESCRIPTION OF THE DRAWINGS

The accompanying drawings which are incorporated in and constitute a part of the specification, illustrate one embodiment of the invention and together with the description, serve to explain the principles of the invention.

The invention will now be further described by way of example, with reference to the accompanying drawings, in which.

DETAILED DESCRIPTION OF THE PRESENT INVENTION

Figure 1:
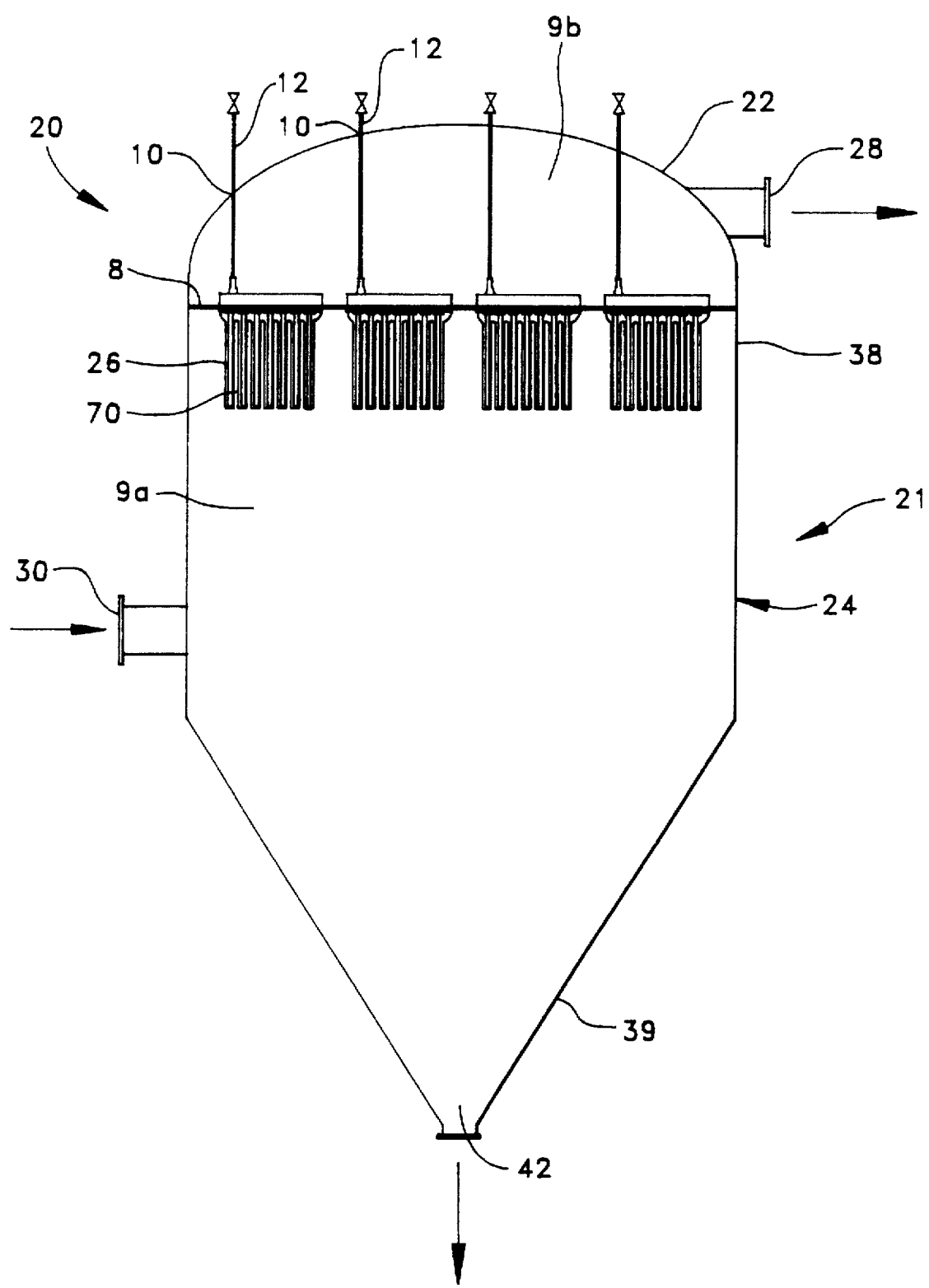
FIG. 1 is longitudinal view of a hot gas cleanup system incorporating a plurality of plenum vessels in accordance with the present invention.

FIGS. 1 shows a filtering apparatus 20 for separating particulate matter from a dirty gas stream in accordance with the present invention. The filtering apparatus 20 comprises a conventional pressure vessel 21 having a domed-shaped head 22, a body 24, and required insulation (not shown).

The domed-shaped head 22 defines an exit opening or nozzle 28 for the gas processed within the pressure vessel 20. The body 24 includes a dirty gas inlet 30, an upper part 38 having a generally circular cylindrical shape joined by a frusto conical lower part 39 for receiving the particulate matter terminating in a linear tip defining an opening or nozzle 42 connected to a hopper (not shown) for collecting particulate matter. A plurality of ports 10 extend from the dome-shaped head 22 and provide a site for inserting instrumentation and for viewing the interior of the dome-shaped head 22 during shut-down periods. Tubes 12 for supplying a back pulse burst of gas for cleaning the filter elements 70 are sealed through each port 10.

Also shown in FIG. 1 is a primary tubesheet 8 that divides the pressure vessel into a dirty gas side 9a and a clean gas side 9b. In accordance with the present invention, a plurality of plenum chambers 26 are generally shown. Each plenum chamber 26 is supported within the dirty gas side 9a of the pressure vessel. Each plenum chamber 26 houses a plurality of filter elements 70. The filter elements 70 are securely coupled within the plenum chamber 26.

A first row of plenum chambers 26 are coupled to the primary tubesheet 8 and a support pipe 11 (shown in FIG. 2) depending from the primary tubesheet 8. The remaining rows of plenum chambers 26 are supported by corresponding secondary tube sheets which are integrated into structural units by tubular members. Each tubular member is secured centrally (coaxially) within the pressure vessel 22. A shed or particle-deflector having a generally frusto-conical shape is attached above each plenum chamber 26. The plenum chambers 26 are supported within the pressure chamber by a method that is similar to the method used in conventional pressure vessels for supporting filter clusters as described in U.S. Pat. No. 5,143,530 and disclosed in the Background of the Invention above. The plenum chamber 26 is shown in more detail in FIGS. 2 through 4 and described more fully below.

Figure 2:
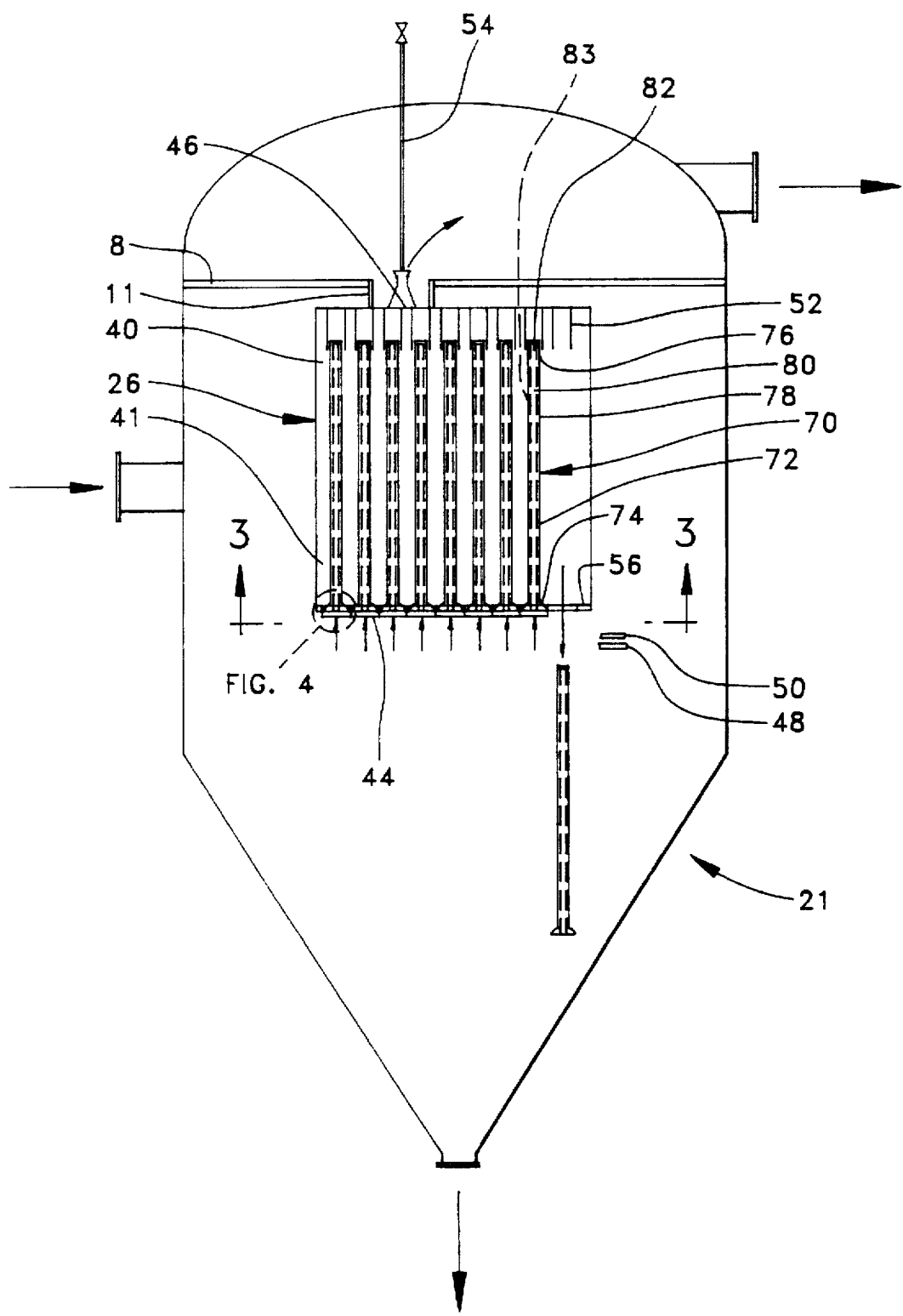
FIG. 2 is a longitudinal view of a hot gas cleanup system incorporating a single plenum chamber as shown in FIG. 1.

FIG. 2 shows a single plenum chamber 26 supported within the pressure vessel 21. The plenum chamber 26 is supported by a support pipe 11 that is coupled to the tubesheet 8. The plenum chamber 26 comprises a sidewall 40 which defines a clean gas chamber 41. A plurality of dirty gas ports 44 and at least one clean gas exit 46 are formed in the side wall 40. It is preferable that the clean gas exit 46 and dirty gas ports 44 be formed on opposite sides of the side wall 40. At least one clean gas flow pipe 83 is coupled to the clean gas exit 46. The back pulse pipe 54 is securely positioned above and adjacent to the clean gas flow pipe 83. The plenum chamber 26 is preferably made of a steel material.

FIG. 2 also shows filter element guides or springs 52 securely coupled within the clean gas chamber 41. A filter element support plate 56 having a plurality of slots 56a that are aligned coaxially with corresponding dirty gas ports 44 is also provided. A plurality of filter elements 70 are shown supported within the clean gas chamber 41. Preferably, the filter elements 70 are hollow tubular candle filter elements. It is noted that other types of filter elements, such as cross-flow filters and filters having internal channels, may be incorporated in accordance with the present invention.

Each candle filter element 70 comprises a porous sidewall 72 having a closed end 76 and an open end 74. The sidewall 72 has an outer surface 78 and an inner surface 80. The porous side wall 72 defines a bore 82 which extends beginning at the open end 74 and terminates at the closed end 76. The bore 82 provides a path for the particulate laden gas to flow thorough so that the gas can be filtered.

Each filter element closed end 76 is supported between a set of filter element guides 52 to prevent potential lateral movement along the filter element closed end 76, while the filter element open end 74 is coupled to the support plate 56 and adjacent to the dirty gas port 44 by a dirty gas port coupler 48. The filter elements 70 are positioned such that the filter element outer surfaces 78 are exposed to the clean gas within the clean gas chamber 41.

Figure 3:
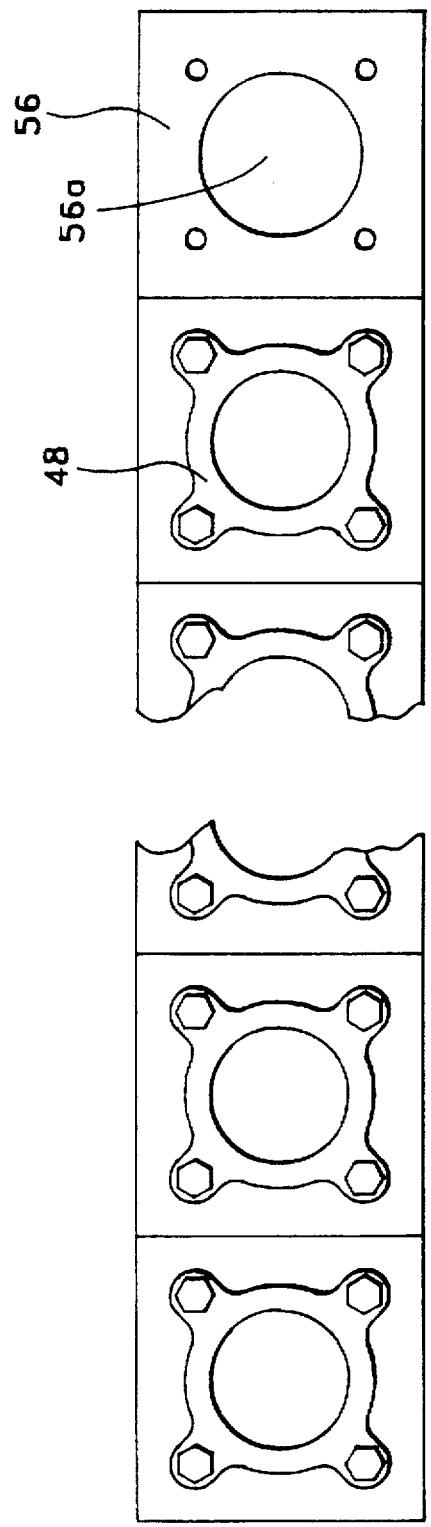
FIG. 3 is a more detailed view of a filter coupled to a support plate as shown in FIG. 2.
Figure 4:
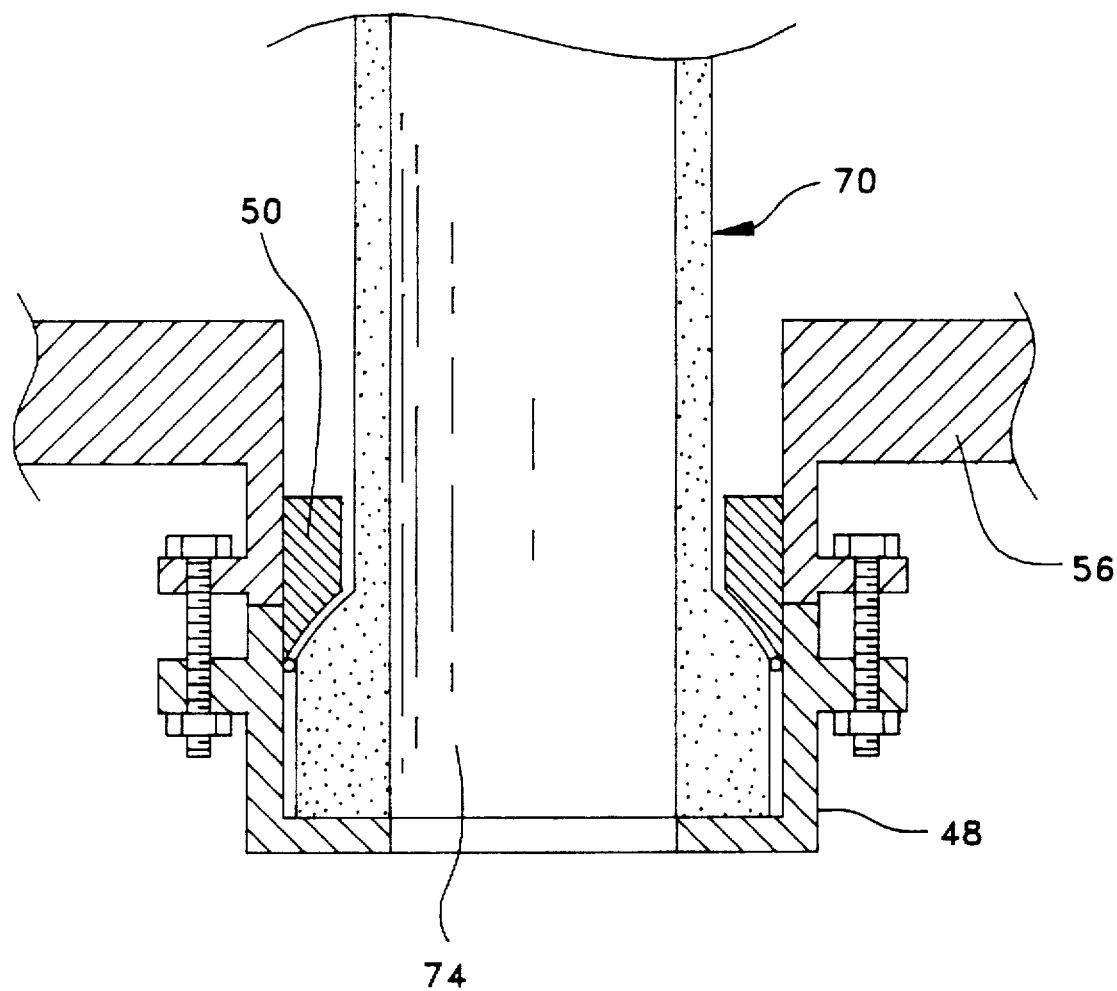
FIG. 4 is a bottom view taken along line 4—4 in FIG. 2.

Referring to FIGS. 3 and 4, at least one particulate barrier gasket 50 is placed between the dirty gas port coupler 48 and filter element open end 74, and dirty gas port 44 and filter element 70 to provide a particulate barrier seal between the dirty gas side 9a and the clean gas chamber 41. The filter element open end 74, gaskets 50, and dirty gas port coupler are securely coupled with the support plate 56.

FIG. 4 shows the plenum chamber dirty gas ports 44 and dirty gas port couplers 48 in more detail. The dirty gas port couplers 48 are shown securely coupled to corresponding dirty gas ports 44. When it is necessary to gain access to a particular filter element, a corresponding dirty gas port coupler 48 can be disconnected so that the filter element 70 can be remove from within the plenum chamber 26.

The operation of the filter apparatus will now be discussed. Dirty gas enter into the pressure vessel 20 through the inlet nozzle 30. The dirty gas travel upwards through the multiple dirty gas inlet ports 44, support plate slot 56a and into the open end 74 of each filter element. The particulate laden gas flows through the bore 82 and the inner surface 80 to be filtered while the clean gas passes through the outer surface 78 of the filter element into the clean gas chamber 41. Particulate matter is collected on the inner surface of the filter element 70. The clean gas within the clean gas chamber 41 then flows through the plenum flow pipe 54 through the domed-shaped head 22 exit nozzle 28 to a desired location.

The gas pressure drop across the filter system will increase as particulate matter accumulates within the inner surface 80 of the filter element 70. A pulse of clean gas from the back pulse system is injected to discharge any accumulated particulate matter from within the filter element 70. The discharged particulate matter will be captured at the pressure vessel bottom and discharged out through the nozzle 42.

In accordance with the present invention, the plenum chamber arrangement prevents the potential for ash formation between filter elements. A further advantage of this arrangement is an that the filter elements may be packed more compactedly than in conventional filters without worrying about ash building up along the filter elements, thereby increasing the filtering surface area through which the hot gas flows and is filtered. The filter arrangement also provides easy maintainability, handling, and replacement of individual filter elements. A further advantage is that should a filter element break or fracture, it is likely to remain in place in the close packed bundle and partially seal small leaks by natural dust accumulation.

It is to be understood that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

We claim:

1. A filtering apparatus for separating particulate matter from a gas stream said filtering apparatus comprising:

a pressure vessel defining an interior chamber having a dirty gas inlet opening and a clean gas exit opening;

a tubesheet securely coupled within said pressure vessel, said tubesheet dividing said pressure vessel into a dirty gas side and a clean gas side;

at least one support pipe for supporting at least one plenum chamber within said pressure vessel dirty gas side, said support pipe being securely coupled with said tubesheet; said at least one plenum chamber supporting a plurality of filter elements, said plenum chamber coupled to said support pipe within said dirty side of said pressure vessel, said plenum chamber comprising a side wall having at least one dirty gas port and clean gas exit formed therein, said side wall further defining a clean gas chamber, said clean gas chamber having a plurality of filter element guides securely coupled therein for supporting said plurality of filter elements within said plenum chamber and preventing said filter elements from moving laterally;

at least one removable dirty gas port coupler for providing a particulate barrier seal between said dirty gas port and said plenum clean gas chamber;

at least one clean gas flow pipe for providing a flow path for filtered gas, said flow pipe securely coupled with said clean gas exit;

at least one filter element support plate for supporting said filter elements within said clean gas chamber, said filter element support plate securely coupled adjacent said dirty gas port, said filter element support plate having at least one slot which is aligned coaxially with said plenum chamber dirty gas port; and wherein said filter elements are mounted vertically within said clean gas chamber and include a tube with an open end and a closed end, said open end being coupled to receive gas from said dirty gas port.

2. The apparatus of claim 1 wherein said plenum chamber is made of a steel material.

3. The apparatus of claim 1 wherein said filter element guides are springs made of a steel material.

4. The apparatus of claim 1 wherein said dirty gas port coupler further comprises at least one gasket for providing a particulate barrier seal between said dirty gas port and said clean gas chamber, said gasket being formed to be coupled between said dirty gas port coupler and said dirty gas port.

5. The apparatus of claim 1 wherein at least one of said filter elements comprises a candle filter element securely coupled within said plenum chamber.

6. The apparatus of claim 1 wherein at least one of said filter elements comprises a cross-flow filter element securely coupled within said plenum chamber.

7. A filtering apparatus for separating particulate matter from a gas stream, said filtering apparatus comprising:

a pressure vessel defining an interior chamber having a dirty gas inlet opening and a clean gas exit opening;

a tubesheet securely coupled within said pressure vessel, said tubesheet dividing said pressure vessel into a dirty gas side and a clean gas side;

at least one plenum chamber within said pressure vessel dirty gas side;

said at least one plenum chamber supporting a plurality of filter elements, said plenum chamber having at least one dirty gas port and clean gas exit formed therein, said plenum chamber comprising a side wall defining a clean gas chamber;

at least one clean gas flow pipe for providing a flow path for filtered gas, said flow pipe securely coupled with said clean gas exit;

at least one filter element support plate for supporting said filter elements within said clean gas chamber; and wherein said filter elements are mounted vertically within said clean gas chamber and include a tube with an open end and a closed end, said open end being coupled to receive gas from said dirty gas port.

8. The apparatus of claim 7, wherein said clean gas chamber encloses a plurality of filter element guides for supporting said plurality of filter elements within said plenum chamber and preventing said filter elements from moving laterally.

9. The apparatus of claim 8 wherein said filter element guides are springs made of a steel material.

10. The apparatus of claim 7 further comprising at least one removable dirty gas port coupler for providing a particulate barrier seal between said dirty gas port and said plenum clean gas chamber; wherein said dirty gas port coupler further comprises at least one gasket for providing a particulate barrier seal between said dirty gas port and said clean gas chamber, said gasket being formed to be coupled between said dirty gas port coupler and said dirty gas port.

11. The apparatus of claim 7 wherein at least one of said filter elements comprises a candle filter element securely coupled within said plenum chamber.

12. The apparatus of claim 7 wherein at least one of said filter elements comprises a cross-flow filter element securely coupled within said plenum chamber.

* * * * *